United States Patent [19]

Bergfelt et al.

[11] 4,221,150

[45] Sep. 9, 1980

[54] GLASS SCRIBING APPARATUS

[75] Inventors: Nils H. Bergfelt, Santa Rosa; H. William Bruce, Sebastopol; Heinz J. Roeser, Santa Rosa, all of Calif.

[73] Assignee: Optical Coating Laboratory, Inc., Santa Rosa, Calif.

[21] Appl. No.: 963,314

[22] Filed: Nov. 24, 1978

[51] Int. Cl.³ .............................................. B26D 3/08
[52] U.S. Cl. .................................... 83/882; 33/32 C; 83/451; 83/564; 83/884; 83/886
[58] Field of Search ............... 83/882, 883, 884, 886, 83/451, 564; 33/32 C

[56] References Cited

U.S. PATENT DOCUMENTS

| | | | |
|---|---|---|---|
| 728,417 | 5/1903 | Sage | 33/32 C |
| 1,852,310 | 4/1932 | Klages et al. | 33/32 C |
| 2,357,206 | 8/1944 | Klages | 33/32 C |
| 3,222,963 | 12/1965 | Nabiullin et al. | 83/267 X |
| 3,286,893 | 11/1966 | Zellers, Jr. | 225/96.5 X |
| 3,424,357 | 1/1969 | Curtze et al. | 225/9.65 X |
| 3,518,907 | 7/1970 | Pinel | 83/564 X |
| 3,715,945 | 2/1973 | Mochizuki et al. | 83/374 X |

*Primary Examiner*—J. M. Meister
*Attorney, Agent, or Firm*—Flehr, Hohbach, Test

[57] ABSTRACT

Apparatus for scribing a planar work piece includes a vacuum chuck table and a scribe bridge assembly moveable along shaft tracks straddling the table surface. The bridge assembly supports first and second sets of scribe devices which can be alternately rotated into engagement with a work piece as the bridge assembly moves along the tracks. The assembly is driven at both ends by chain drives by synchronized movement.

10 Claims, 17 Drawing Figures

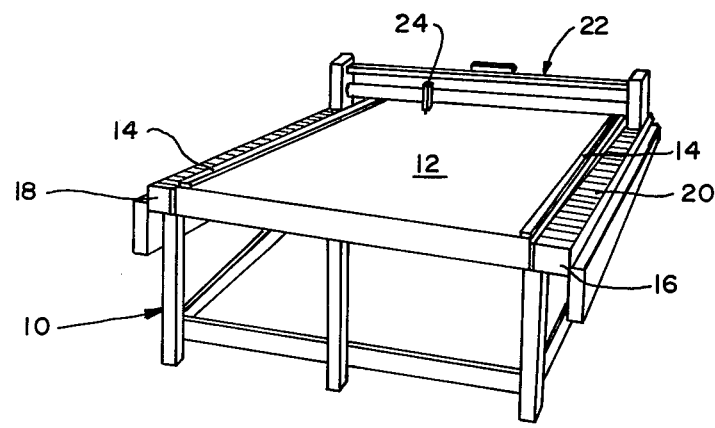
FIG.—1
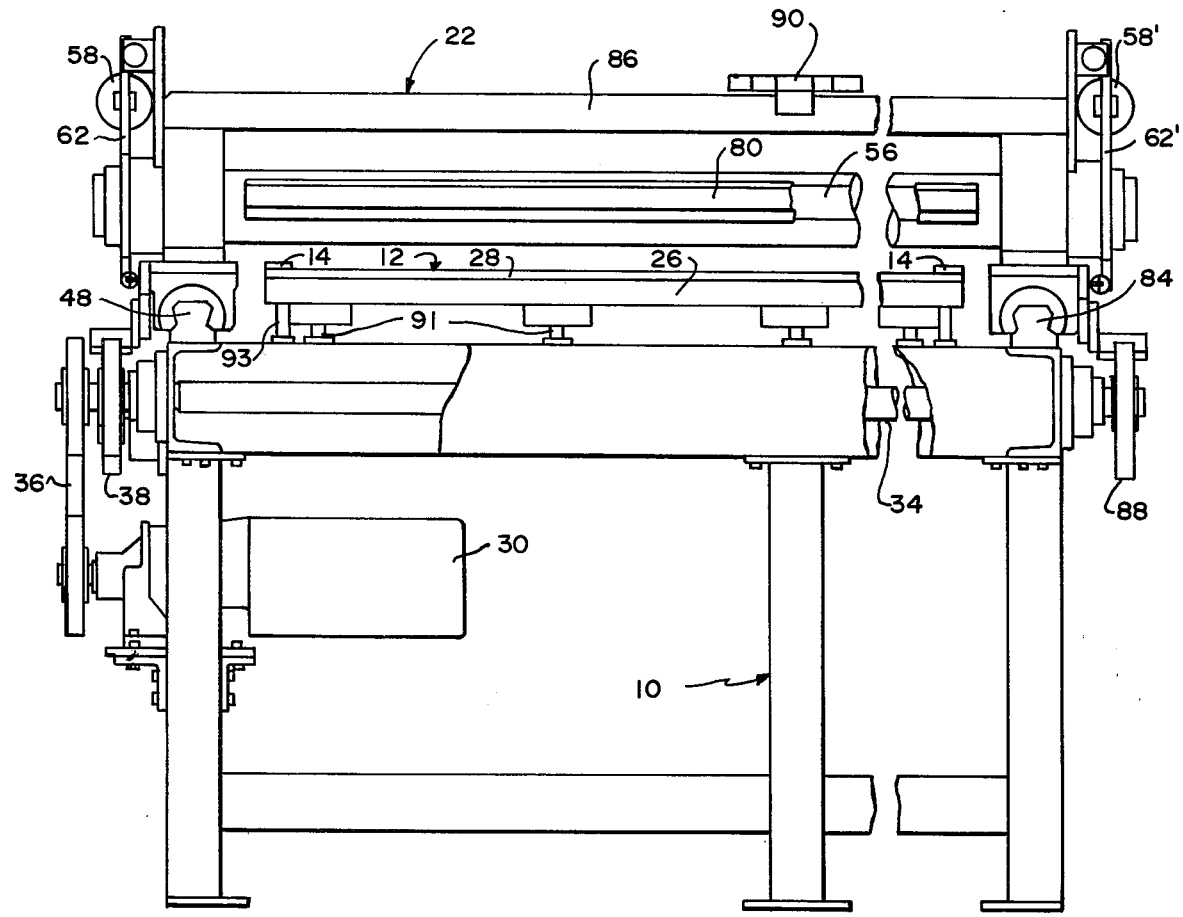
FIG.—4

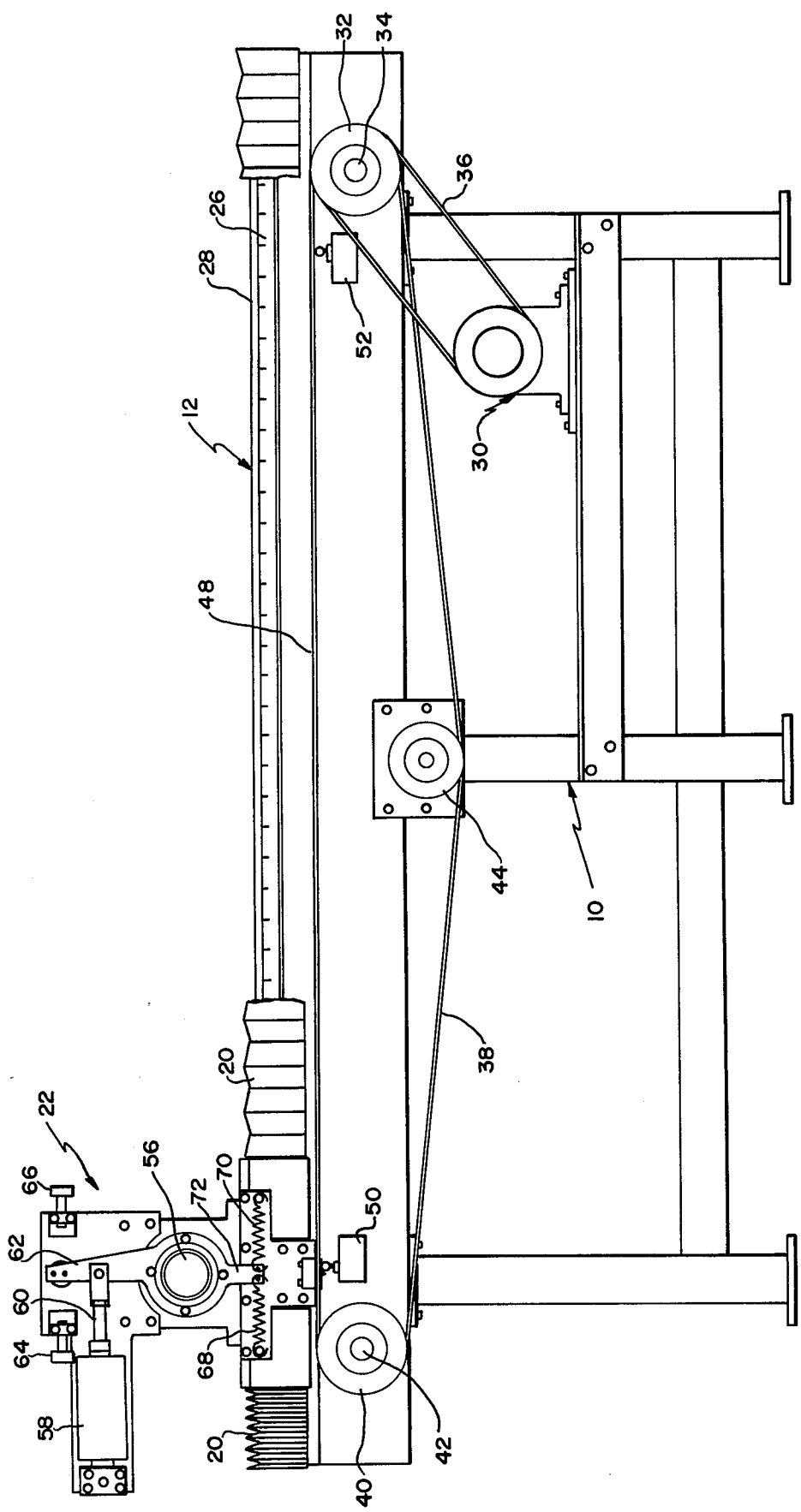
FIG.—2

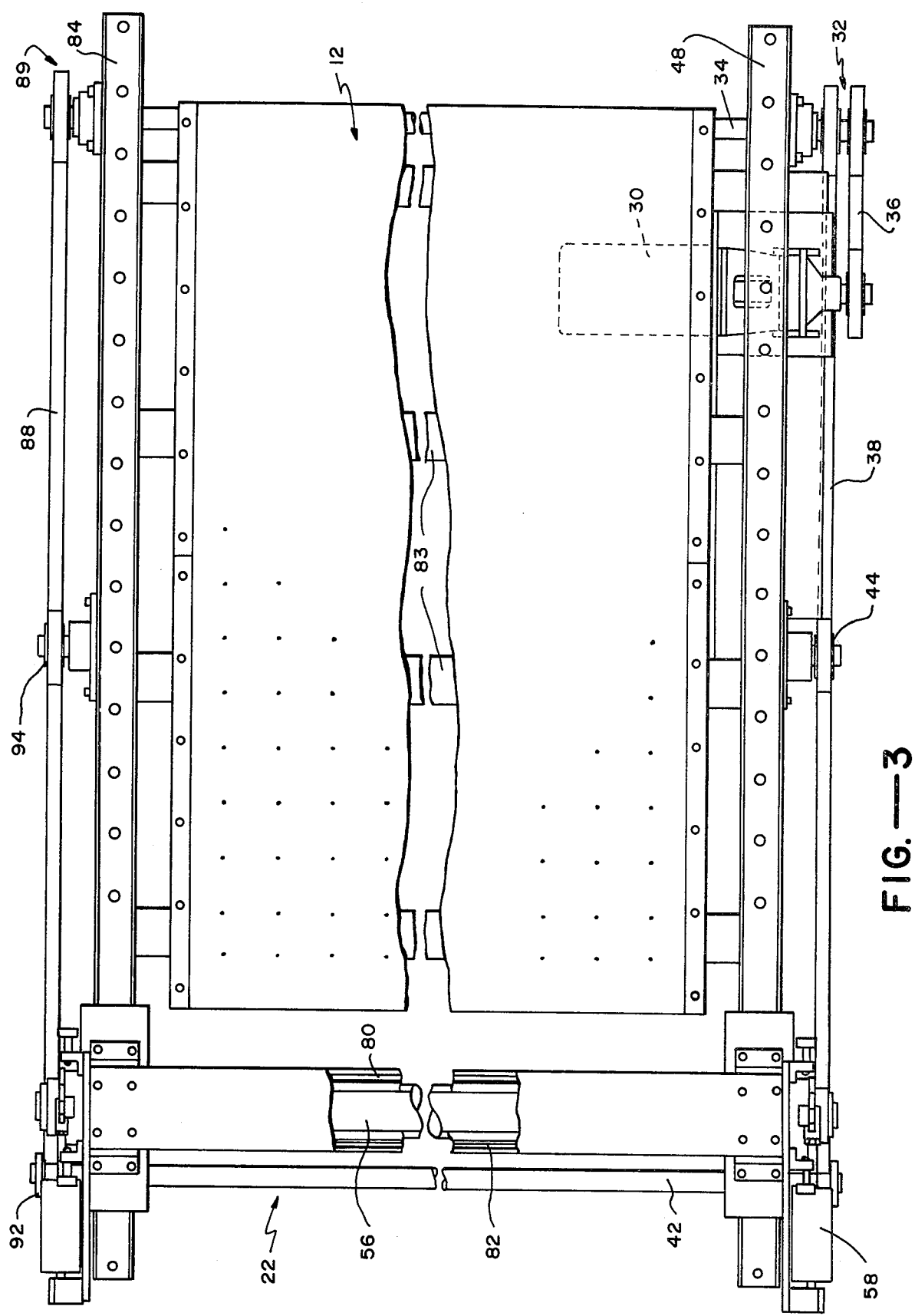
FIG.—3

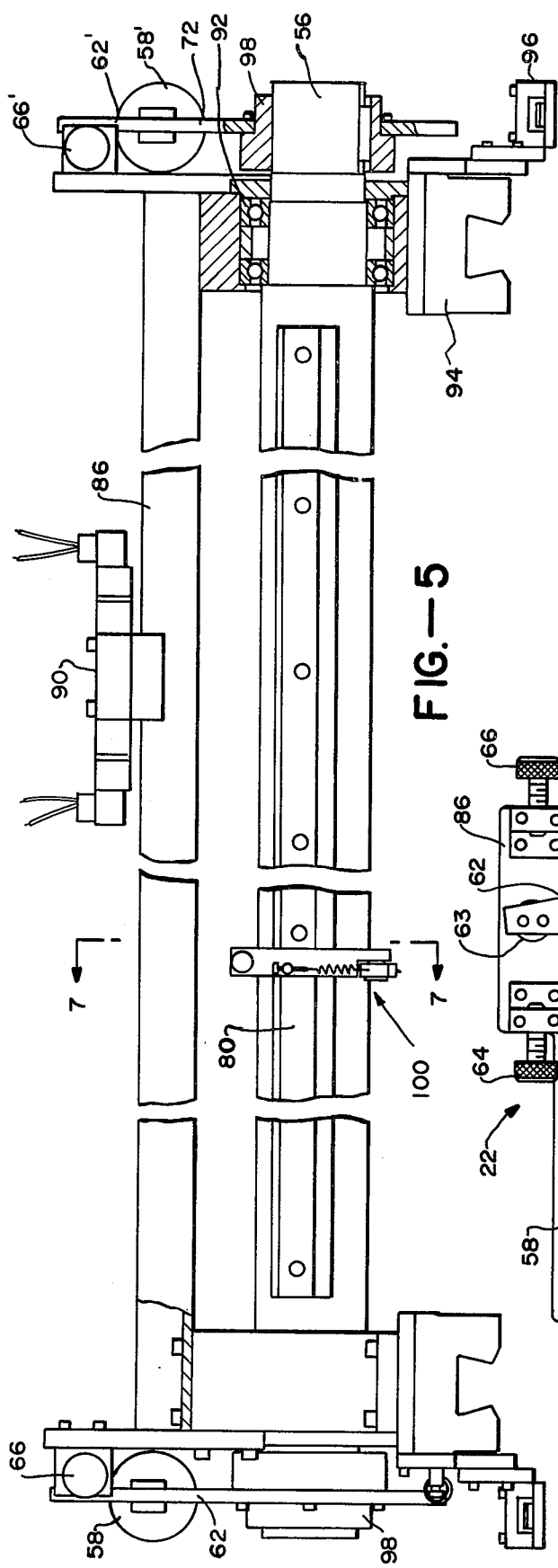
FIG.—5
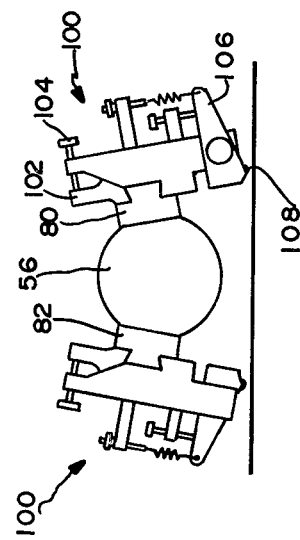
FIG.—7
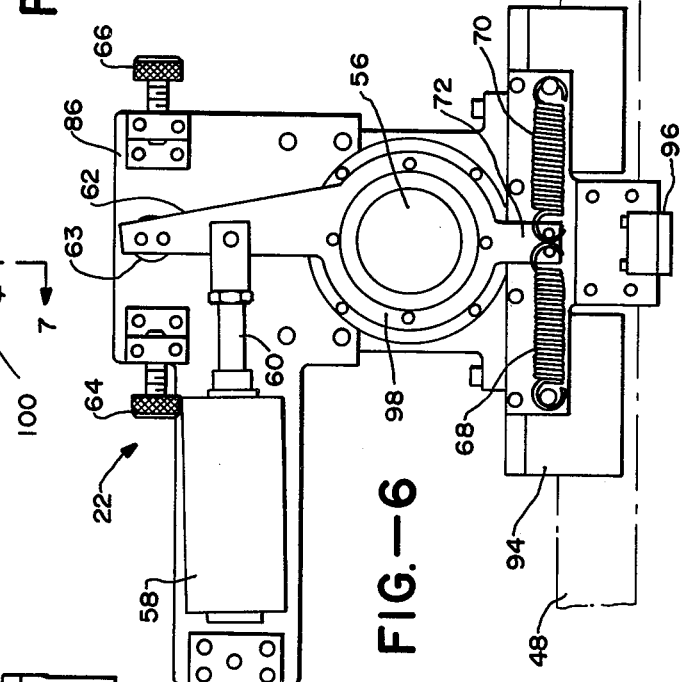
FIG.—6

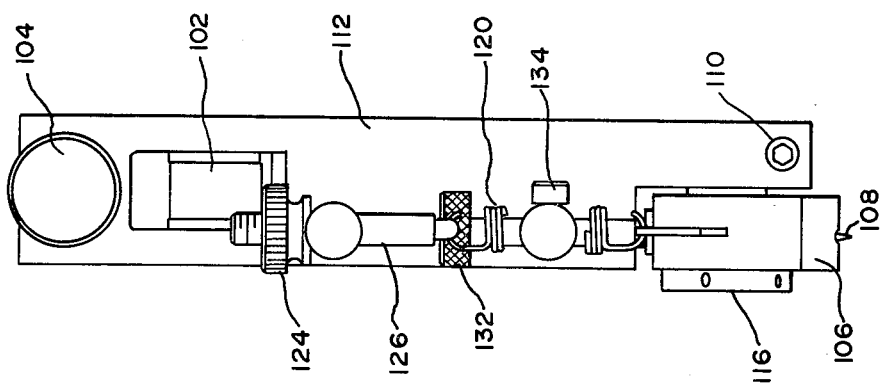
FIG.—9
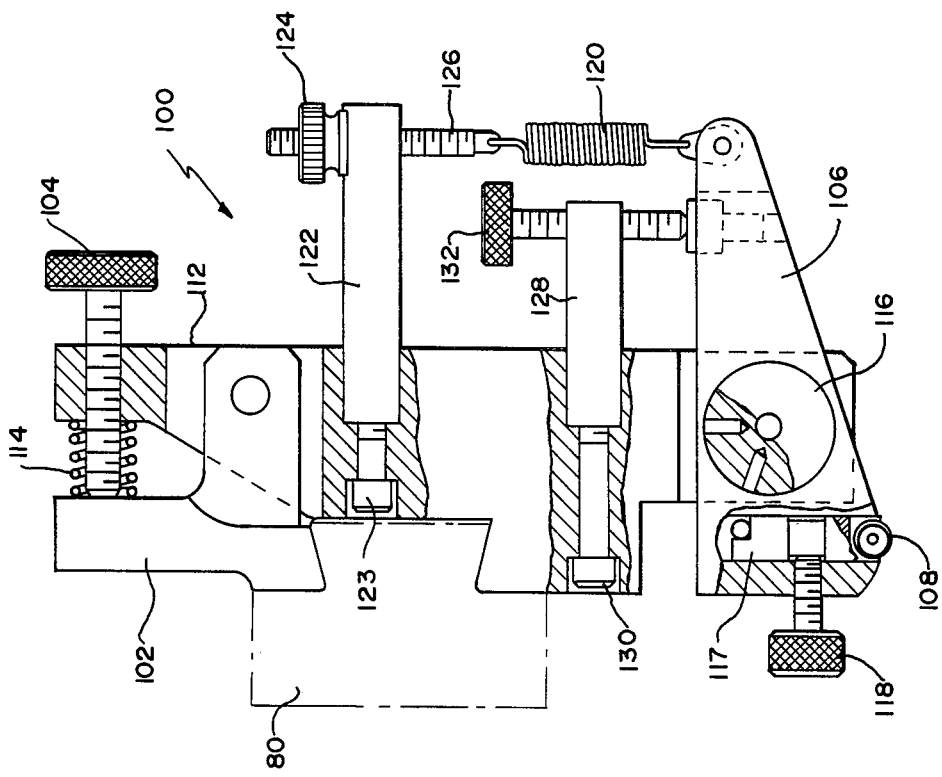
FIG.—8

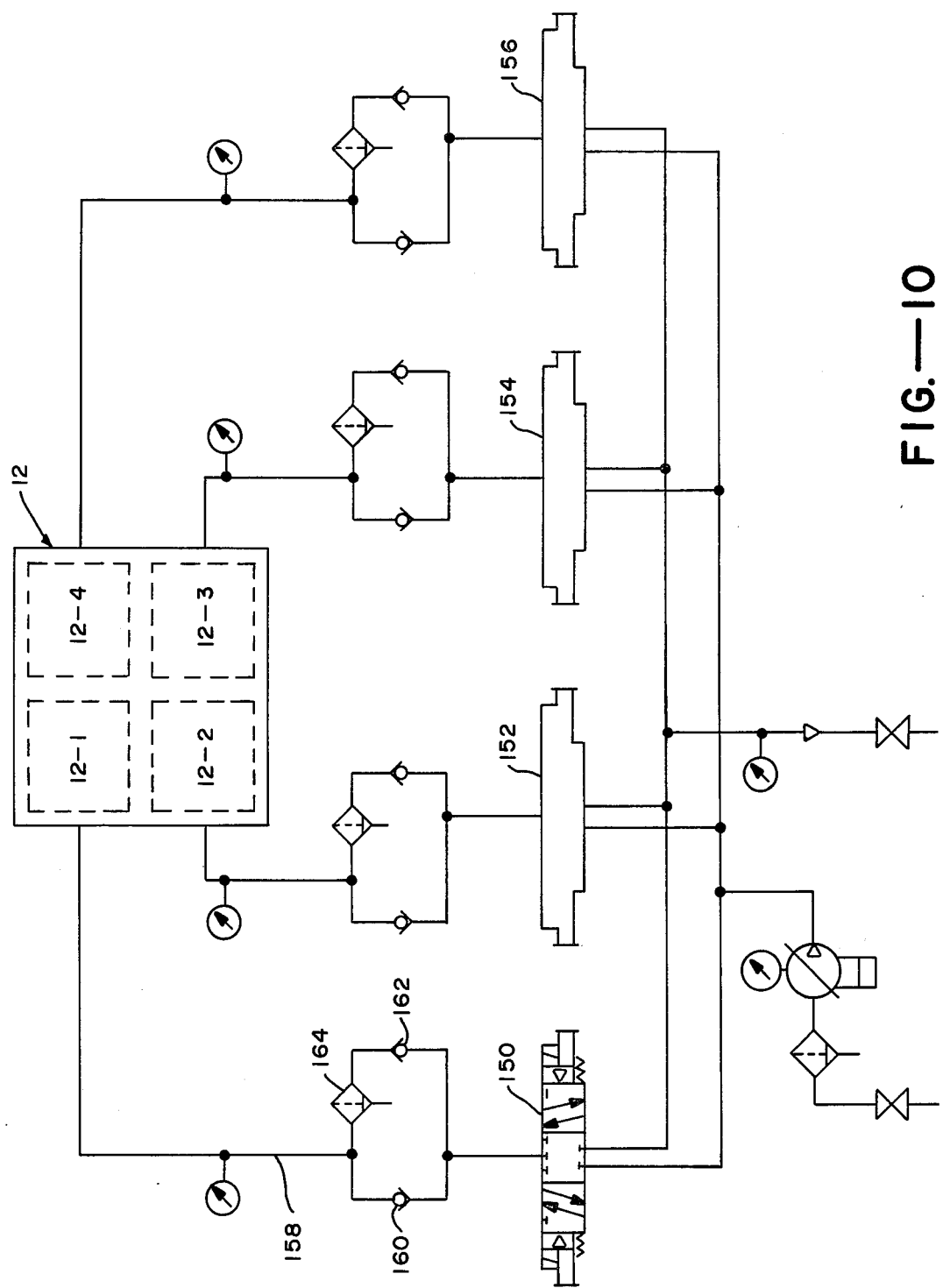
FIG.—10

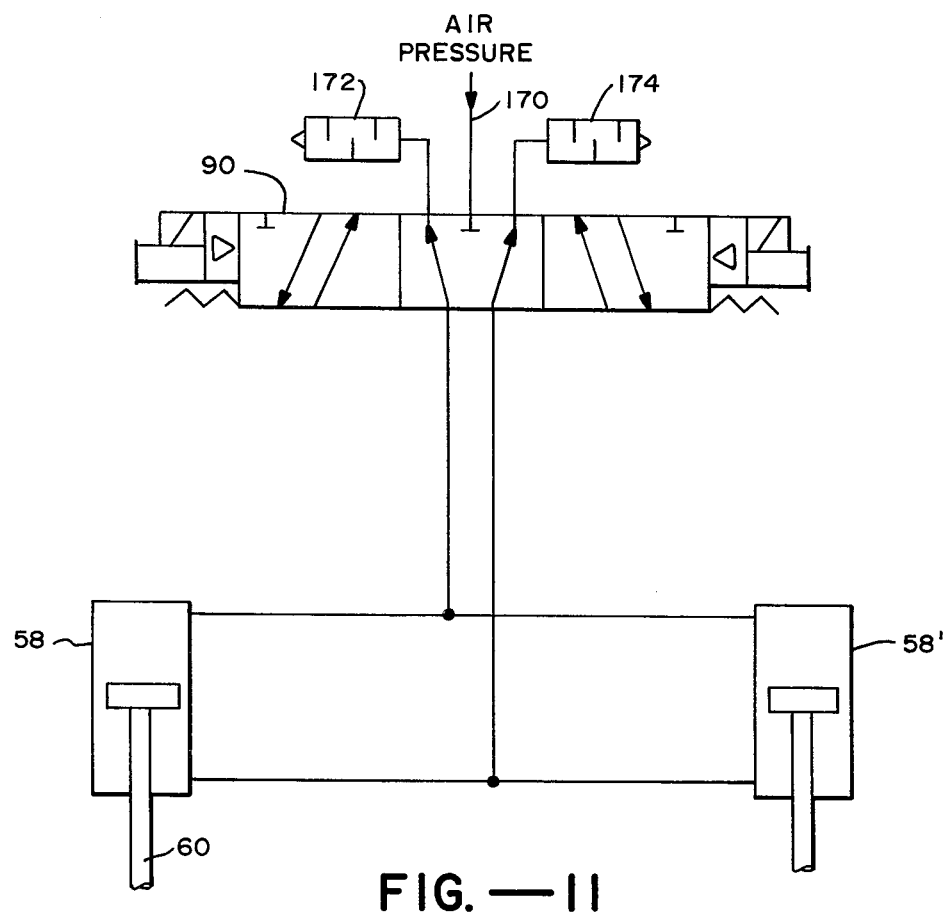
FIG.—11
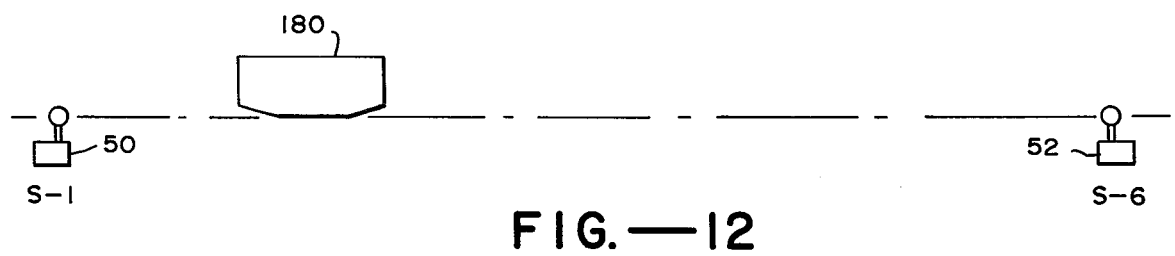
FIG.—12
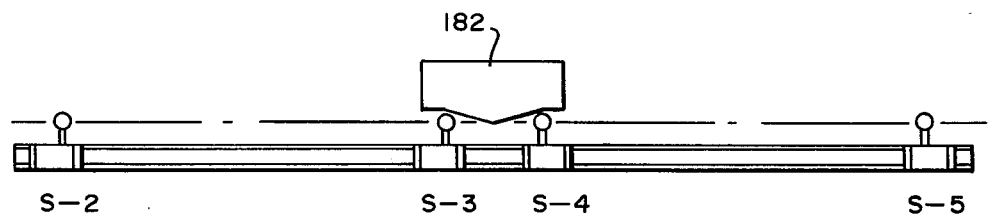
FIG.—13

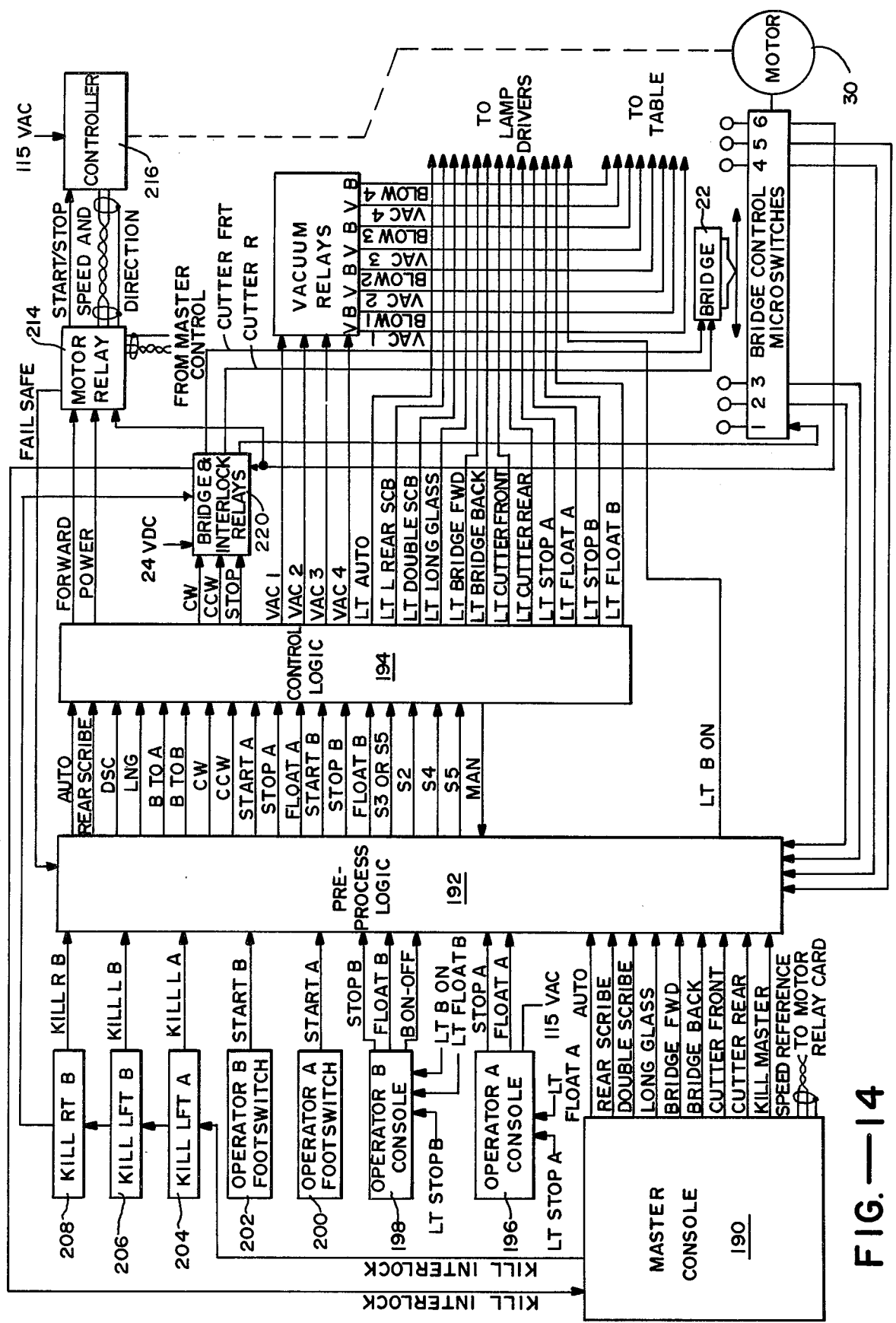
FIG.—14

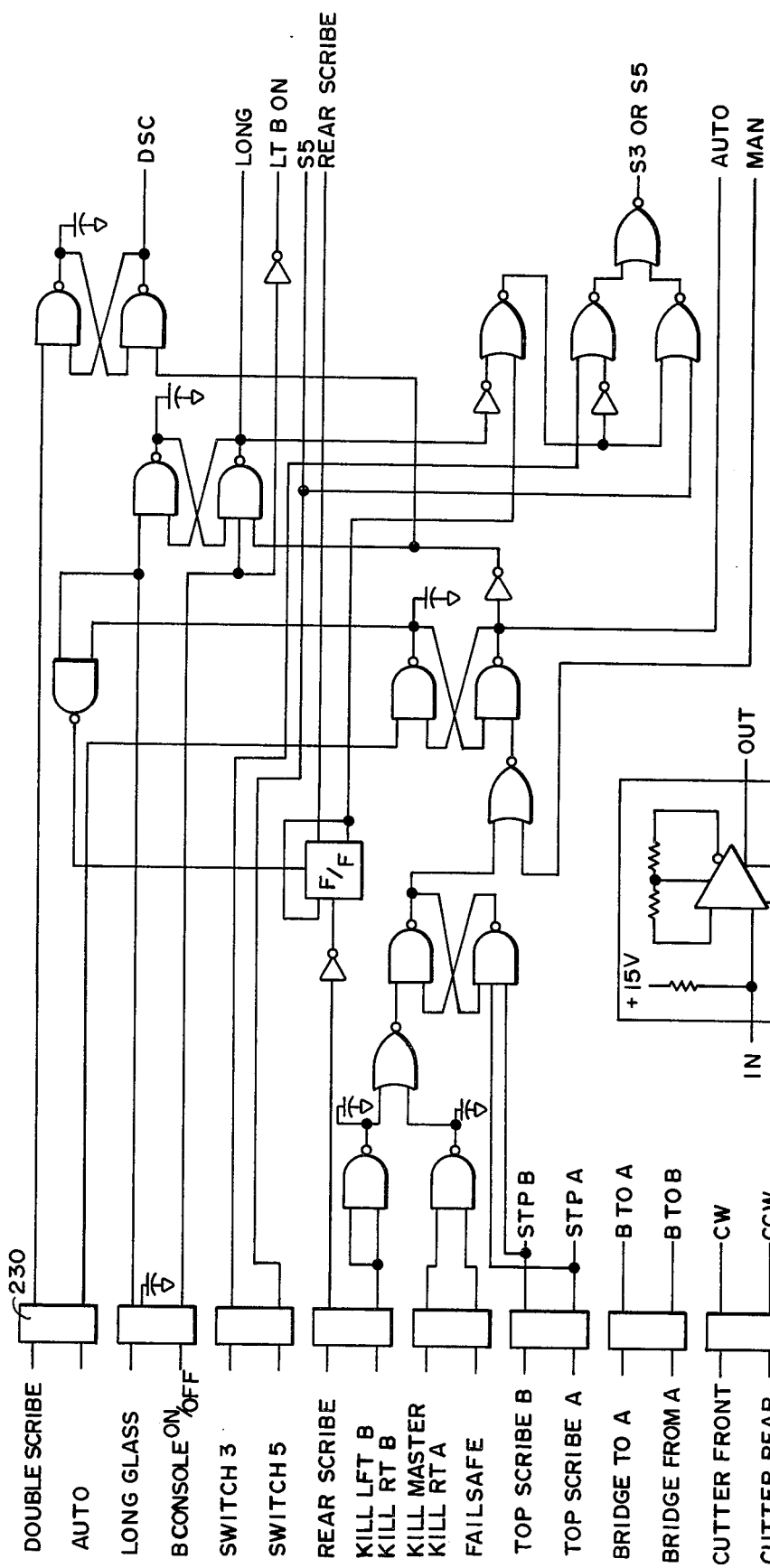
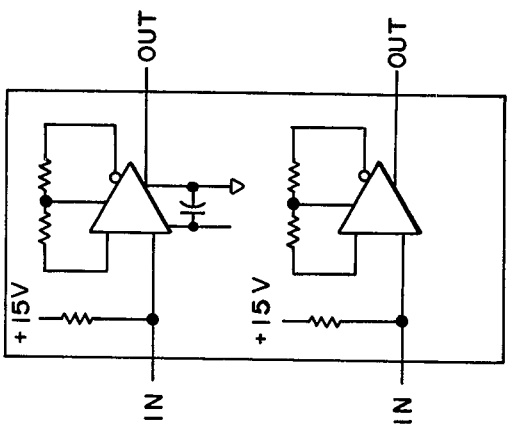
FIG.—15
FIG.—16

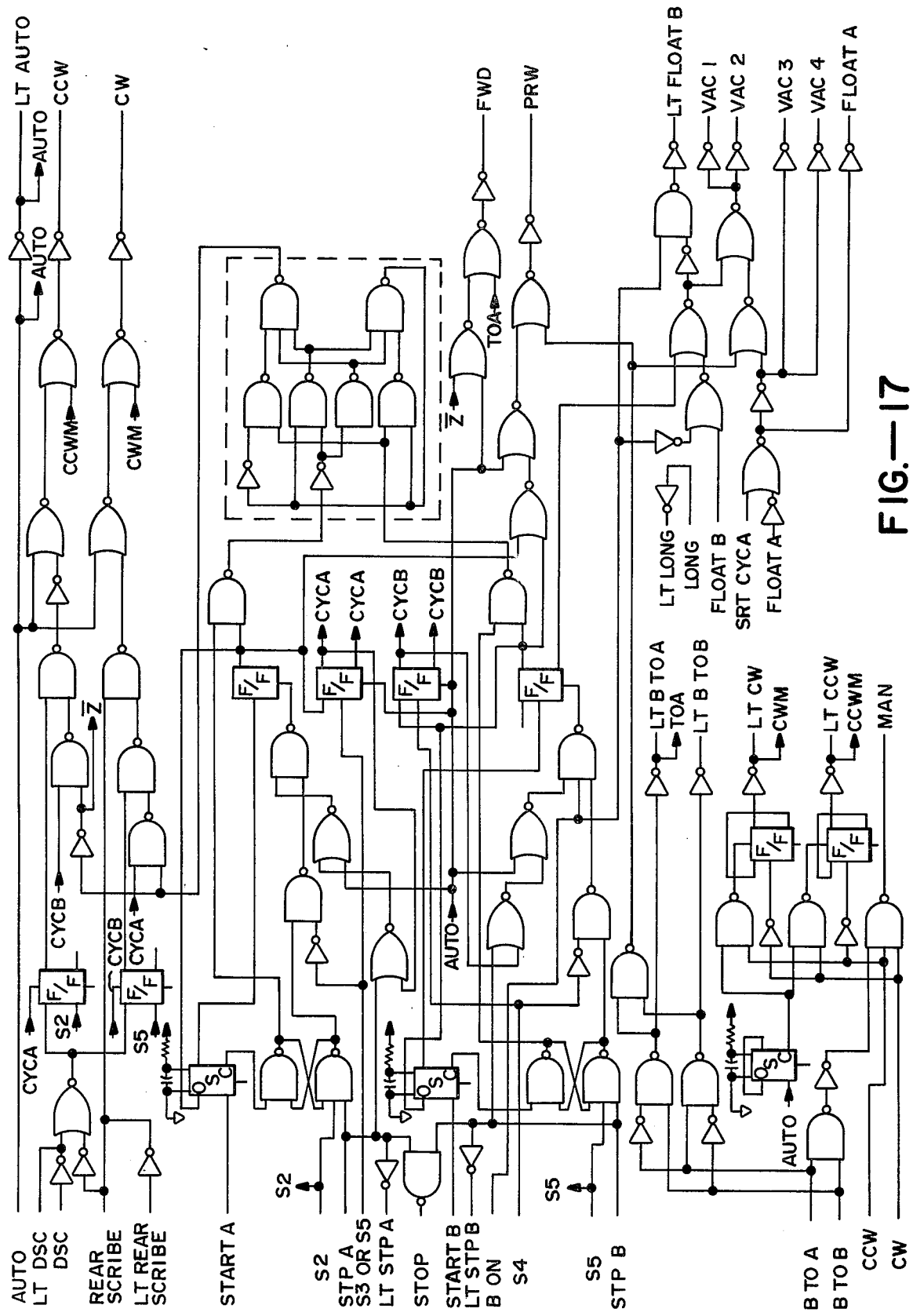
FIG.—17

GLASS SCRIBING APPARATUS

BACKGROUND OF THE INVENTION

This invention relates generally to manufacturing apparatus, and more particularly the invention relates to apparatus for scribing planar work pieces such as glass plate.

Apparatus is presently available for scribing glass plate and the like. Typically, the apparatus includes a frame and work surface for receiving the glass plate and a scribing assembly mounted above the work piece and moveable therealong. Scribing devices in the assembly are linearly moveable into engagement with the work piece for scribing as the assembly is moved.

Prior art apparatus has limitations in scribing accuracy due to movement of the scribing assembly and movement of the scribing devices therein. Further, mounting and positioning of the scribing devices often has been difficult and with attendant loose alignment tolerances. Moreover, spacing of scribed lines is limited due to physical size of abutting scribing devices.

SUMMARY OF THE INVENTION

An object of the present invention is improved scribing apparatus.

Another object of the invention is scribing apparatus having improved accuracy.

Still another object of the invention is scribing apparatus which allows a plurality of operators to concurrently process material.

Yet another object of the invention is apparatus having a plurality of scribing devices which are readily mounted and positioned.

Another object of the invention is apparatus which facilitates closely spaced scribe lines.

Another object of the invention is scribing apparatus having manual and automatic modes of operation.

A feature of the invention is scribing apparatus having a vacuum chuck table with vacuum control means for a plurality of portions of the table.

Another feature of the invention is a bridge assembly mounted on track means for movement by drive means on each end of the bridge assembly.

Another feature of the invention is scribing means mounted to the bridge assembly and rotatable into engagement with a work piece.

Yet another feature of the invention is the provision of scribing devices on opposing sides of the bridge assembly whereby one set of scribing devices can be rotated in one direction into engagement with a work piece and another set of scribing devices can be rotated in an opposite direction into engagement with a work piece.

Another feature of the invention is a scribing device which engages a dovetail guide bar in the bridge assembly and is slidable thereon for positioning and which includes also fine adjustment positioning means.

Briefly, the scribing apparatus in accordance with the present invention includes a frame with vacuum chuck means mounted thereon for receiving a planar work piece. Track means are provided on either side of the chuck means, and a bridge assembly is moveably mounted on the track means. Preferably, drive means is provided on either end of the bridge assembly to facilitate accurate movement thereof. Scribing means mounted on the bridge assembly are rotated into engagement with the work piece. Preferably, the bridge assembly includes a shaft member on which the scribing means are mounted for rotation.

The scribing means preferably engage dovetail guide bars mounted on the rotatable shaft whereby the scribing means can be readily removed from the guide bar, slid along the guide bar, and locked to the guide bar.

By providing a first set of scribing means on one side of the shaft member and a second set of scribing means on the opposite side of the shaft member, closer spacing of scribe lines is facilitated as the first scribe means can be interlaced in position with the second set of scribe means.

The invention and objects and features thereof will be more readily apparent from the following detailed description and appended claims when taken with the drawings.

BRIEF DESCRIPTION OF THE DRAWINGS

FIG. 1 is a perspective view of one embodiment of apparatus in accordance with the present invention.

FIG. 2 is a side elevation view of the apparatus of FIG. 1.

FIG. 3 is a top view of the apparatus in FIG. 1.

FIG. 4 is a front elevation view of the apparatus of FIG. 1.

FIG. 5. is a front elevation view partially in section of the bridge assembly of the apparatus in FIG. 1.

FIG. 6 is a side elevation view of the bridge assembly of FIG. 5.

FIG. 7 is a section view of the bridge assembly taken along the lines 7—7 of FIG. 5 and illustrates the mounting of scribe devices to the bridge assembly.

FIG. 8 is a side view partially in section of a scribing device useful in the apparatus in FIG. 1.

FIG. 9 is a front elevation view of the scribing device of FIG. 8.

FIG. 10 is a schematic of the pneumatic control for the vacuum chuck in the apparatus of FIG. 1.

FIG. 11 is a schematic of the pneumatic control of the bridge assembly in the apparatus of FIG. 1.

FIG. 12 and FIG. 13 illustrate micro switches useful in controlling the movement of the bridge assembly.

FIG. 14 is a functional block diagram of control circuitry for the apparatus of FIG. 1.

FIG. 15 is a more detailed schematic of the preprocess circuitry in the control circuitry of FIG. 14.

FIG. 16 is a schematic of voltage level adjustment circuitry used in the preprocess circuitry of FIG. 15.

FIG. 17 is a functional schematic of the control logic and interface in the control circuitry of FIG. 14.

DETAILED DESCRIPTION OF THE ILLUSTRATED EMBODIMENT

FIG. 1 is a perspective view of one embodiment of scribing apparatus in accordance with the present invention. The apparatus includes a steel frame or table base 10 on which a cutting table 12 is mounted. As will be described further below, the table includes a vacuum chuck and wear plate which are mounted to the support frame by means of leveling screws and pads. The table also includes edge bars 14 along the side of the table for aligning a work piece.

Along both sides of table 12 are rail members mounted within housing 16 and 18 which include a top bellows member 20 for protecting the rail members from dust particles. Moveably mounted on the rail members and above table 12 is a bridge assembly 22 which is driven at either end by chain drive means (not shown). Mounted on either side of the bridge assembly are a plurality of scribe devices 24 which can be rotated into engagement with a work piece mounted on the table 12 for scribing the work piece as the bridge assembly moves along the two rails.

The vacuum chuck of the cutting table is commercially available from Thompson Vacuum Company, Sarasota, Florida and has a plurality of longitudinal and latitudinal grooves cut in its surface which are connected to vacuum lines. By masking off the vacuum chuck in sections with a rubber ribbon placed in the grooves, any one or more of the sections can have a vacuum pulled thereon or supplied with pressurized air for floating and positioning a work piece on the table. The aluminum wear plate mounted on the top surface of the vacuum chuck protects the chuck from wear and can be lined with different materials such as felt, Formica, Mylar or other suitable material for supporting the work piece. In mounting the wear plate to the vacuum chuck the periphery of the plate will be sealed to the chuck with suitable means such as rubber ribbon. A plurality of holes extending through the wear plate communicate the vacuum from the chuck to a work piece.

The two track shafts are preferably of the BA type commercially available from THK Co., Ltd. of Japan. The cutter bridge assembly is mounted to the track shafts by means of linear bearings. The track shafts are bolted to the support frame with the housing and bellows protecting the track from dust.

The drive assembly for the cutter bridge includes a variable speed electric motor, a Cyclodrive speed reducer, Morse Silent Chain drive at either end of the bridge assembly, and a common axle for the two chain drives. As will be described hereinbelow, tension is maintained in the chain by means of an adjustable idler sprocket.

The cutter bridge assembly includes a pivot shaft which is rotatable by air cylinder means, and two guide bars are mounted on each side of the pivot shaft for receiving scribe devices. Air cylinders on either end of the cutter bridge assembly rotate the pivot shaft in one direction to engage a first set of scribe devices and rotate the pivot shaft in the opposite direction to engage a second set of scribe devices. As will be described, the air cylinders are controlled either by manual switches or by automatic control.

Referring now to FIG. 2, a side elevation view of the apparatus of FIG. 1 is illustrated. The bellows 20 is partially removed to show the vacuum chuck 26 and wear plate 28 of the table 12. Mounted to table base 10 is the variable speed electric motor 30 and speed reducer which drive a double sprocket 32 mounted on a front axle 34 by means of chain 36, which in turn drives chain 38. Chain 38 moves over the sprocket 32 on the front axle 34, sprocket 40 mounted on rear axle 42, idler wheel 44, and drives the cutter bridge assembly 22. As the bridge assembly 22 is moved along rail 48 by the chain drive, a plurality of micro switches (not shown) are engaged by the cutter bridge assembly to control travel thereof. Limit switches 50 and 52 mounted on the frame are positioned at the travel limit of the cutter bridge assembly as fail safe mechanisms to stop operation of the apparatus in the event the cutter assembly overruns the micro switches.

The bridge assembly is illustrated in FIG. 2 at the extreme left end of travel in engagement with limit switch 50. The bellows 20 to the left of the cutter bridge assembly is shown compressed while the bellows 20 to the right of the cutter bridge assembly 22 is shown extended. Thus, the two rails are protected during the travel of the cutter bridge assembly 22 thereon by the expansion and compression of the bellows 20.

Cutter bridge assembly 22 includes a pivot shaft 56 which is rotatably mounted in the assembly and rotatable by means of an air cylinder 58 having a piston shaft 60 mounted to pivot lever 62 for rotating shaft 56. Lever 62 assumes one of three positions by actuation of cylinder 58 including a neutral position as shown, a left position for engaging a first set of scribe devices through counter clockwise rotation of pivot shaft 56, and a right position for engaging a second set of scribed devices by clockwise rotation of pivot shaft 56. Adjustable stops 64 and 66 limit the travel of lever 62 in either the left or right rotational directions. Springs 68 and 70 are attached to arm 72 opposite from lever 62 to yieldably bias lever 62 in the neutral position where neither set of scribe devices engage a work piece.

Referring now to FIG. 3, a top view of the apparatus of FIG. 1 is illustrated. In this view a portion of the cutter bridge assembly 22 is removed to further illustrate the pivot shaft 56 and the front and rear bars 80 and 82 attached to the front and rear of pivot shaft 56 for the mounting of scribe devices. The cooperative relationship of the pivot shaft and mounting bars will be further appreciated from the description of FIG. 7 hereinbelow.

A portion of table 12 is removed to illustrate horizontal members 83 of the frame on which the table is mounted. Additionally, the bellows are removed to show the top of rail 48 and the top of rail 84 on the opposite side of table 12 from rail 48. Motor 30 drives front axle 34 by means of chain 36 which engages sprocket 32 mounted on axle 34. Axle 34 in turn drives chain 38 which is mounted on sprocket means to front axle 34, rear axle 42, and idler wheel 44. On the opposite side of the table is a second chain 88 which is mounted to sprocket 89 on the front axle, sprocket 92 on the rear axle, and an idler wheel 94. Thus, it will be appreciated that movement of the cutter bridge assembly 22 along rails 48 and 84 is by means of chain drive on both ends of the cutter bar assembly. By so providing dual drive of the cutter bridge assembly 22, synchronized drive and improved accuracy in movement of the assembly is realized.

Referring now to FIG. 4, a front elevation of the apparatus of FIG. 1 is illustrated with portions of the apparatus removed to further illustrate elements of the structure. The pivot shaft 56 of the cutter bridge assembly 22 is rotated from the left end by means of air cylinder 58 and lever 62, and on the right end of the pivot shaft 56 is a similar air cylinder 58' and lever 62' for rotating the shaft. Bar 80 for mounting of scribe devices (not shown) is shown attached to the front side of pivot shaft 56. Solenoid 90 for controlling the air cylinders is mounted on top brace 86 of the assembly.

The table 12 including wear plate 28 and chuck 26 is mounted on frame 10 by means of flat head adjustment screws 91 which adjust the height of the table 12 for leveling purposes. In one embodiment twenty such adjustable flat head set screws are supported on the horizontal bars 83 (FIG. 3) to support the vacuum chuck and wear plate which comprise the table 12. Locating posts 93 are provided for positioning the table.

A portion of the frame 10 is removed to illustrate the front axle 34 on which drive chain 38 and 88 rotate in moving the cutter bridge assembly 22. The cutter bridge assembly 22 is mounted on linear bearings on tracks 48 and 84.

FIG. 5 is a front elevation view of the cutter bridge assembly 22 and further illustrates the mounting of pivot shaft 56 in the assembly by means of bearing 92. A similar bearing arrangement is provided in the other end of the assembly for supporting the pivot shaft. Bearing 92 is mounted in the assembly directly above saddle member 94 which accommodates the linear bearing for travel along the rail. Depending from saddle 94 is clamp 96 to which the drive chain is attached and which engages the micro switches positioned along the track as the assembly moves from one end of the table to the other. Screw stops 64, 66 are mounted at the upper portion of the assembly to limit the rotational movement of the pivot shaft 56 upon actuation of air cylinder 58. Arm 62 is mounted to the shaft by means of a collar 98, and arm 62 is actuated by the air cylinder 58 to rotate shaft 56.

Mounted on support bar 80 is a scribe device shown generally at 100. Mounting of the scribe device 100 to bar 80 will be further described with reference to FIG. 7 below.

Solenoid 90 is mounted on brace 86 and controls the application of pressure to air cylinders 58 and 58'.

FIG. 6 is an enlarged side elevation of the cutter bridge assembly 22 illustrating the mounting and cooperative relationship of air cylinder 58 having its piston shaft 60 attached to lever 62 for rotation of pivot shaft 56. Screws 64 and 66 establish stops for the lever 62 by engaging wheel 63 mounted on one end of lever 62 upon rotation of lever 62 either right or left. Springs 68 and 70 are mounted on the assembly and engage arm 72 depending from collar 98 to yieldably bias the lever in a neutral position as shown. Saddle 94 including the linear bearing for engaging rail 48 includes the chain clamp 96.

FIG. 7 is a section view of the cutter bridge assembly 22 taken along lines 7—7 of FIG. 5 and further illustrates the mounting of the scribe devices 100 on bars 80 and 82 attached on the pivot shaft 56. As will be illustrated in greater detail in FIG. 8, each scribe device 100 has a surface which mates with the dovetail surface of the bars 80 and 82 including a retractable arm 102 which is locked to the dovetail surface of bar 80 by means of screw 104 and which is released from the dovetail assembly by releasing screw 104. At the other end of each scribe device 100 is the scribing element 106 which includes a hard (e.g. tungsten carbide) tip or wheel 108. The scribe device is illustrated and described in more detail with reference to FIG. 8.

Referring now to FIGS. 8 and 9, the scribe device 100 is shown in greater detail with portions thereof removed to illustrate the mounting of elements of the device. The scribe device is shown attached to the dovetail surface of bar 80 with arm 102 locked into engagement with bar 80 by means of screw 104. Screw 104 extends through the main body 112 of the device and spring 114 yieldably maintains arm 102 in engagement with bar 80 when screw 104 is retracted, thereby facilitating the sliding of the scribe device along the bar while preventing the scribe device from falling from the support bar 80.

The scribe support rocker arm 106 is pivotally mounted on body 112 by means of a support shaft which is clamped in body 112 by locking screw 110. By rotating head 116 the scribe element can be moved with respect to the support shaft and body 112 of the scribe device thereby providing a fine alignment of the scribe point 108. Scribe 108 is preferably a small disc which is mounted on a support element 117 which is maintained in a receiving cavity in rocker arm 106 by means of thumb screw 118.

It will be noted in FIG. 8 that the scribe point 108 is offset from the body 112 of the scribe device. This offset allows the arm 106 to pivot as the scribe is rotated into engagement with a work piece. A desired pressure is maintained on the scribe point by means of spring 120 which is attached between one end of arm 106 and a support rod 122 mounted in body 112 by means of a screw 123. Nut 124 threadably engages member 126 and tension exerted by spring 120 can be adjusted by moving nut 124 on member 126. Another rod 128 is attached to body 112 by means of a screw 130 and threadably supports screw 132 which limits the travel of arm 106 in response to the tension of spring 120. Screw 134 threadably engages rod 128 and when inserted locks thumb screw 132.

Referring now to FIG. 10, a schematic diagram of the pneumatic control for the vacuum chuck is illustrated. In this embodiment the cutting table 12 is divided into four quadrants designated 12-1, 12-2, 12-3, and 12-4. Thus, a work piece can be floated by air pressure or attached by vacuum to any one or all of the quadrants. Vacuum and pressure for each quadrant is controlled by means of solenoid valves 150, 152, 154 and 156. As illustrated with valve 150, energization and movement of the solenoid to the right applies pressure through valve and line 158 to table quadrant 12-1. Conversely, energization and movement of the solenoid to the left pulls a vacuum through line 158 on quadrant 12-1. Check valves 160 and 162 are provided in line 158 whereby the vacuum pulled on the cutting table is through a filter 164 to remove any particles from the table. Electrical control of the solenoid 150-156 is illustrated below in the control circuitry in FIG. 14 and more specifically in FIGS. 15 and 17.

FIG. 11 is a schematic diagram of the pneumatic control of the air cylinders 58, 58' of the cutter bridge assembly. Air pressure is applied through line 170 to the two air cylinders in parallel depending on the setting of solenoid 90. Mufflers 172 and 174 are provided at the exhausts of the air cylinders. Energization and movement of solenoid 90 to the right applies pressure to the top chambers (as illustrated) of the air cylinders thereby forcing the pistons of the air cylinders out. Energization movement of the solenoid to the left applies pressure to the bottom chambers of the air cylinders thereby pushing the pistons upwardly and pulling in the air cylinder shafts. Control of solenoid 90 by relay means is described below in the electrical schematic of FIG. 14.

FIGS. 12 and 13 illustrate camming surfaces 180 and 182 of the switch engaging member 96 of the cutter bridge assembly (see FIG. 5). As shown in FIG. 12, the limit switches 50 and 52 (as shown in FIG. 1) and designated S-1 and S-6, respectively, are engaged by cam surface 180 when the cutter bridge assembly moves to the limit of travel along the two rails. In FIG. 13 cam surface 182 engages switches designated S-2, S-3, S-4 and S-5 which are movably positionable along the rail to establish lengths of travel of the cutter bridge assembly during a scribing operation. The switches S-1 through S-6 are further identified in the control circuitry illustrated in FIG. 14.

Referring now to FIG. 14 a functional block diagram of control circuitry for the apparatus of FIG. 1 is illustrated. The control circuitry allows an automatic mode of apparatus operation and a manual mode of apparatus operation. Further, an operator A console is provided at one end of the table (designated the A end) and an operator B console is provided at the other end of the table (designated the B end) to control the operation for concurrent use by two or more operators. Moreover, at both ends of the apparatus provision is made for one operator on the left quadrant and for another operator on the right quadrant.

In the manual mode of operation, the operator can manually set switch means to move the cutter bridge assembly forward and back, rotate the cutter bridge assembly whereby either the front cutters or the rear cutters are rotated to engage a work piece, and control the vacuum and float (pressure) to the vacuum chuck of the table quadrant in which the operator is working.

The primary components of the control circuitry include a master console 190, preprocess logic 192, and control logic 194. Also provided is an operator A console 196 and an operator B console 198. The operators are provided also with an A foot switch 200 and a B foot switch 202, respectively, whereby the operators can start the automatic mode of operation after positioning of the work piece. Safety interlock is provided to stop operation in either of the A or B quadrants by switches 204, 206, and 208 and a switch on the master console.

Master console 190 provides inputs to the preprocess logic 192 including an automatic mode signal, rear scribe operation, double scribe (scribing both directions of travel of the bridge assembly), long glass (in which intermediate micro switches are not employed), bridge forward, bridge back, cutter front operation, cutter rear operation, and a master kill signal for stopping all operation of the apparatus. The master console 190 also provides a speed control signal to the drive motor of the bridge assembly.

Preprocess logic 192 includes voltage level adjustment circuitry to regulate the input voltages for compatibility with the control logic 194. Additionally, the preprocess logic responds to the fail safe and kill operation input signals.

The preprocess logic 192 provides the following output logic signals:

Auto—Automatic mode of operation
Rear scribe—Determines rear scribers
DSC—Double scribe operation
LNG—Long glass being processed, intermediate switches inactivated
B to A—Cutter bridge assembly moves toward position A
B to B—The cutter bridge assembly moves toward position B
CW—Cutter bridge assembly is rotated clockwise (for front scribe engagement)
CCW—Cutter bridge assembly is moved counter-clockwise (for rear scribe engagement)
Start A—Automatic mode of operation for position A begins
Stop A—Automatic operation for position A is stopped
Float A—Pressure is applied to the A end of the work table
Start B—Operation at the B end of the work table begins
Stop B—Automatic operation at the B end of the table is stopped
Float B—Air pressure is applied to the B end of the work table
S3 or S5—Signal from micro switch S3 or micro switch S5
S2—Signal for micro switch S2
S4—Signal for micro switch S4
S5—Signal from micro switch S5
Man—A feedback signal to the preprocess logic for manual mode of operation only Control logic 194 receives the above input signals from the preprocess logic 192 and in response thereto controls the sequence of operation of the vacuum chuck, cutter bridge assembly movement, and engagement of the scribe devices. The control logic provides a direction (forward, reverse) and power signal to motor relay 214. Motor relay 214 also receives the speed control signal from the master console 190 and controls the speed and direction of the drive motor 30 through controller 216. 115 volts AC power is provided to the controller as indicated. Motor relay 214 also provides a fail safe signal back to the preprocess logic 192.

Control logic 194 also provides the CW, CCW, and stop signals to the bridge and interlock relays 220, which are operated from +24 volts dc. The bridge and interlock 220 provides control signals to bridge 22 including cutter front and cutter rear control signals to the solenoid controlling the air cylinders of the bridge 22.

The bridge interlock 220 also includes a fail safe circuit which is connected through switch S1 and switch S6. Movement of the bridge 22 along the rails to either end of the track whereby either switch S1 or switch S6 is engaged interrupts the fail safe circuit, and the bridge interlock 220 in response thereto generates a kill interock signal which is fed back to master control 190.

Control logic 194 also provides signals to lamp driver circuits for energizing lamps in the master control 190, as indicated.

FIG. 15 and FIG. 17 are logic diagrams for the preprocess logic 192 and the control logic 194, respectively. The following circuits commercially available from Motorola, Inc. were used in the construction of one specific embodiment:

NOR gate—MC 14001 CP
2 input NAND gate—MC 14011 BCP
3 input NAND gate—MC 14023 BCP
Inverter—MC 680TL, MC 14049 BCL
Flip-flop—MC 14013 BCL
Monostable Multivibrator—MC 14528 B In FIG. 15, the preprocess logic 192 includes voltage level adjustment circuitry 230 which receives the inputs listed on the left side of the diagram and adjusts the input levels to 0 and +15 volts for compatibility with the control logic. The level adjustment circuitry 230 is shown schematically in FIG. 16 and includes a Motorola MC696TL differential amplifier which is operated from a +15 volt supply.

Most of the input signals after voltage level adjustment are ready as inputs for the control logic. However, some signals are dependent upon other inputs or require storage in memory elements before they can be used by the control logic. These signals are the DSC, LONG, S3 or S5, rear scribe and auto output signals.

Referring to FIG. 17, the control logic receives the level adjusted and processed signals from the preprocess logic and operates on the input signals to generate the apparatus control signals in safe and sequential steps.

Following is the operating sequence for several modes of operating:

Single Scribe Regular Glass.
 a. Machine set up. Cutting depth and scribing speed.
   1. Move the bridge toward the main operator side by pushing "bridge forward" pushbutton and holding until bridge is in desired location.
   2. To lower the cutters nearest the main operator side, momentarily push the "cut fwd" pushbutton. The cutters will remain in position as long as the pushbutton head is lit. To raise the cutters momentarily press the "cut fwd" pushbutton again.
   3. When the cutter set up has been completed, move the bridge to the center of the table by pressing the "bridge reverse" pushbutton.
   4. Adjust the cutting speed with the speed control knob.
   5. The set up procedure for the other side of the table is identical to that described above except that the cutters must be lowered with the "cutter rev" pushbutton.
 b. Automatic scribe operation.
   1. Press the "auto" pushbutton. When the pushbutton is illuminated the machine is in the automatic mode.
   2. Both operators press their respective start switches as required to scribe glass on their side.
 c. Stop scribe cycle.
   1. For minor changes stop the scribe cycle by momentarily pressing the "stop" pushbutton. The scribe cycle stops short and the bridge returns to the start position.
   2. For major problems hit any one of the 4 kill buttons. The bridge halts and raises the cutters.

Doublescribe Regular Glass (both operators).
 a. Set up as before for single scribes.
   1. Adjust the front and rear cutters by pushing the proper "cut fwd" and "cut rev" pushbuttons. Pressing both buttons simultaneously raises both sets of cutters.
   2. Locate the work to be scribed on the table so that the cutters *away* from the operator start their scribes at the front edge of the glass.
 b. Automatic scribe operation.
   1. Press the "auto" pushbutton first then the "double-scribe" pushbutton. When both buttons are illuminated, the machine will perform the doublescribe operation.
   2. Scribe glass as desired.
 c. The stop scribing as before for single scribes.

Scribe Long Glass.
 a. Set up as before for single scribes.
 b. Automatic scribe operation.
   1. Press the "auto" button.
   2. Press the "long glass" pushbutton. If both "auto" and "long glass" pushbuttons are lit the machine will scribe long glass.
   3. Only the main operator is able to scribe by pushing his start switch. Pushing the start switch on the other side has no affect of the machine.
 c. Stop the scribe cycle as before for single scribes.

Doublescribe Long Glass.
 a. Set up as before for single scribes.
 b. Automatic scribe operation as before for long glass scribing, except that the "doublescribe" pushbutton must be pushed after the other two.
 c. Stop the scribe cycle as before for single scribes.

Resetting the Machine after a "Kill" Pushbutton has been Pressed.
 a. Clear the source of the problem.
 b. Press the "stop" pushbutton.
 c. Move the bridge to the center of the table with the appropriate "bridge forward" or "bridge reverse" pushbutton.
 d. Press the "auto" pushbutton and any other options (long or doublescribe).
 e. Proceed to scribe as before.

Resetting the Machine after it has Traveled into the Stops.
 a. Move the bridge out of the stop area by pushing the bridge toward the center of the table.
 b. Once out of the stops determine why the bridge over-traveled and make appropriate corrections and adjustments.
 c. Reset the electronics by following the sequence described for resetting a "kill".

Limit Switch Function (Switches S2–S5)
 a. When single scribing short glass; the main operation has started his cycle;
   1. The bridge encounters S3 and lowers the cutter heads.
   2. The bridge encounters S2, raises cutters and reverses direction of travel.
   3. The bridge encounters S3 and stops.
   4. When the other operator begins his sequence S4 and S5 perform the cutter head operation and turnaround as required.
 b. When doublescribing short glass; the main operator has started his cycle;
   1. Bridge—S3 : lower heads
   2. Bridge—S2 : raise heads and lower opposite heads, reverse direction.
   3. Bridge—S3 : raise all heads and stop.
 c. When scribing long glass; bridge parked at S5.
   1. Bridge—S5 : lower heads.
   2. Bridge—S4 : no action.
   3. Bridge—S3 : no action.
   4. Bridge—S2 : raise heads, reverse direction.
   5. Bridge—S3 : no action.
   6. Bridge—S4 : no action.
   7. Bridge—S5 : stop.
 d. When doublescribing long glass; operation is the same as for long glass except that front cutters raise and rear cutters lower at S2 and all cutters raise at S5.
 e. When rear scribing; bridge parked at S5.
   1. Bridge—S5 : No action.
   2. Bridge—S4 : No action.
   3. Bridge—S3 : No action.
   4. Bridge—S2 : Lower rear cutter heads; reverse direction
   5. Bridge—S3 : No action.
   6. Bridge—S4 : No action.
   7. Bridge—S5 : Raise cutter heads, stop, cancel rear scribe command.

While the invention has been described with reference to a specific embodiment, the description is for illustration purposes and is not to be construed as limiting the scope of the invention. Various modifications, adaptations, and other changes may occur to those skilled in the art without departing from the true spirit and scope of the invention as defined by the appended claims.

1. Apparatus for scribing a planar work piece such as glass plate comprising
 a frame,
 chuck means mounted on said frame for receiving a work piece,
 track means,
 a bridge assembly mounted on said track means and moveable thereon, said bridge assembly including a shaft member positioned above said chuck means and moveably mounted in said bridge assembly, scribing means including a first set of scribing devices mounted on one side of said shaft member and a second set of scribing devices mounted on an opposite side of said shaft member whereby said scribing means can be rotated into engagement with a work piece by movement of said shaft member, and means for moving said shaft member in a first direction for rotating said first set of scribing devices into engagement with a work piece and moving said shaft member in a second direction for rotating said second set of scribing means into engagement with a work piece, and
 drive means for driving bridge assembly on said track means.

2. Apparatus as defined by claim 1 wherein said shaft means includes first and second dovetailed guide bars and each of said scribing devices includes means for engaging said guide bars whereby said scribing devices can be removed from said guide bars, slid along said guide bars, and locked to said guide bars.

3. Apparatus as defined by claim 2 wherein each of said scribing devices includes a cutting member, means for yieldably biasing said cutting member into engagement with the surface of a work piece, and stop means for limiting the travel of said cutting member by said biasing means.

4. Apparatus as defined by claim 3 wherein said scribing means further includes screw adjustment means for adjusting the position of said cutting member in said scribing means.

5. Apparatus as defined by claim 1 and further including means for applying to said chuck means a vacuum for holding a work piece and for applying to said chuck means air pressure for positioning a work piece on said chuck means.

6. Apparatus as defined by claim 5 wherein said chuck means includes a vacuum chuck and a wear plate mounted on said vacuum chuck.

7. Apparatus as defined by claim 5 wherein said chuck means includes a plurality of vacuum chucks and a plurality of wear plates.

8. Apparatus as defined by claim 1 wherein said drive means for driving said bridge assembly includes first and second chain drives on opposite ends of said bridge assembly, an axle connecting said first and second chain drives, and variable speed motor means for driving said axle.

9. Apparatus as defined by claim 1 and further including control means for controlling said vacuum table, said bridge movement, and said scribing means.

10. Apparatus as defined by claim 9 wherein said control means for said vacuum table includes a plurality of solenoid means for applying vacuum and pressure to different portions of said vacuum table, said control means for said bridge movement includes first and second cylinder means for rotating said shaft member of said bridge assembly, and said control means for said bridge movement (scribing means above) includes micro switches along said table which are engaged by said bridge assembly to thereby limit travel of said bridge assembly.

* * * * *